3,510,416
PROCESS FOR THE DRY CHLORINATION OF POLYVINYL CHLORIDE IN THE PRESENCE OF GASEOUS HYDROGEN
Pietro Vaccari and Attilio Palvarini, Milan, Mario De Vita, Matera, and Pietro Pece, Macchia di Ferrandina, Italy, assignors to Manifattura Ceramica Pozzi S.p.A., Milan, Italy, a company of Italy
No Drawing. Filed July 16, 1969, Ser. No. 842,401
Claims priority, application Italy, July 20, 1968, 19,254/68
Int. Cl. C08f 43/00
U.S. Cl. 204—159.18				6 Claims

ABSTRACT OF THE DISCLOSURE

A process for the dry chlorination with gaseous chlorine is disclosed wherein the chlorination is carried out in the presence of a predetermined quantity of hydrogen, in order to increase the reaction velocity.

---

The U.S. patent application No. 715,531 (of the same applicant) described a process for the dry chlorination of PVC in which the chlorination was carried out with gaseous chlorine in the presence of a suitable chlorination carrier and with the help of a photochemically active luminous source. The chlorination carrier defined therein was a PVC swelling agent consisting of a paraffinic chlorine derivative such as chloroform, carbon tetrachloride etc., used in the pure state or in the form of mixtures, where the use of a chlorination carrier resulted in an increase in chlorination velocity and in chlorinated polymers with better characteristics of thermal stability and workability.

According to the U.S. patent application mentioned above, the photochemically active luminous source could either act directly on the entire reacting mass or could be inserted external to the reactor limiting the radiation only to the gaseous chlorine at its entry to the reactor. It was further pointed out that this particular type of activation was advantageous for the purpose of a better thermal stability of the final chlorinated resin.

It has now been ascertained, according to the present invention, that the above process for the dry chlorination of PVC with gaseous chlorine in the presence of chlorination carriers can be further improved by carrying out the chlorination reaction in the presence of a pre-determined quantity of gaseous hydrogen.

The quantity of gaseous hydrogen which is introduced into the chlorination reactor may vary between relatively wide limits and must in any case be less than the explosive limit of hydrogen in chlorine, where such explosive limit corresponds, as is known, to a hydrogen concentration of 10% by volume (see the book "Chlorine" edited by Reinolds, p. 152).

The advantage deriving from the use of hydrogen within the concentration limits defined above is firstly that of an increase in reaction velocity. Further it has been found that in the presence of hydrogen chlorination can be carried out with lower chlorination carrier contents and lower radiation intensity, whether the system of direct radiation of the entire reacting mass is adopted or the system of radiation of only the chlorine or chlorine-hydrogen mixture at the entry to the reactor.

The use of hydrogen, according to this invention, consequently results for like chlorination times in a chlorinated PVC with a higher content of bound chlorine, a reduced specific consumption of chlorine carrier, an increased photochemical efficiency and a final resin which, because of the diminished radiation intensity and diminished degradation effects, possesses an elevated thermal stability and a good initial colour.

Photochemical activation of the chlorination reaction may take place by means of illumination by lamps of different types, such as U.V. lamps, incandescent lamps and fluorescent lamps.

It has been found that fluorescent lamps of the cold light type have the advantage of avoiding local overheating of the resin, permitting a more homogeneous reaction and obtaining products with improved thermal stability and colour characteristics.

This invention is preferably carried out according to a flow arrangement of the continuous process type. Such a process is operated in the following manner:

(A) A dry mixture of PVC and chlorination carrier is prepared, in which the content of this latter lies between 0 and 60 parts of chlorination carrier per 100 parts of PVC, in a continuous mixer which may comprise, for example, a rotating autoclave or a fluid bed reactor. Such a mixer is given the name of "saturator."

(B) The chlorination reactor, which is given the name of "chlorinator," is fed with the dry mixture by way of continuous dosage. The chlorinator is either a vertical fluid bed reactor or a rotating reactor, in which a suitable thermostat system permits an efficient temperature control in the interval between 0 and 80° C. The activation source may be arranged either inside the reactor or external to it, in which case only the gaseous chlorine-hydrogen mixture is irradiated or, preferably, only the gaseous chlorine at the reactor inlet. Feeding of chlorine, hydrogen and possibly recycle gases takes place by way of continuous metering devices.

(C) The chlorinated resin is transferred into a fluid bed reactor or a rotating reactor, in which the chlorination carrier is stripped and the gaseous byproducts are separated. This reactor is given the name of "dryer."

Transport of the dry mixture from the saturator to the chlorinator is carried out by means of pneumatic conveying with chlorine, this process permitting the persaturation of the dry mixture with chlorine wihtout the assistance of other apparatus.

Transport of the chlorinated resin from the chlorinator to the dryer is carried out by means of pneumatic conveying with hot nitrogen. This process results in the preliminary stripping of chlorine and hydrochloric acid as well as arrest of the reaction.

The starting resins to be used in the chlorination process described here are preferably polymers and copolymers of vinyl chloride of the porous type, obtained by the usual processes of polymerisation in suspension.

Chlorinated PVC's have chlorine contents which, according to operating conditions, may pass from 56.7% for normal PVC to about 70%. However, the most interesting chlorinated resins from the point of view of their transformation into plastic manufactured articles are those which contain from 60 to 66% chlorine.

Chlorinated PVC's obtained according to the present invention have thermal stability characteristics higher than those of the corresponding starting PVC's. Thermal stability is indicated according to the time in minutes necessary for a sample of one gramme of powdered resin heated to 190° C. in a current of nitrogen to evolve 0.365 mg. of hydrochloric acid.

The Vicat softening point is determined by tests employing lead stabilisation.

Process details are described in the following examples.

EXAMPLE 1

A dry mixture comprising:

|  | Parts |
|---|---|
| PVC | 100 |
| Chloroform | 15 | is continuously prepared in a fluid bed reactor. The resin previously degassed with nitrogen is fed from above while the chloroform is fed from below in the vapour phase into the fluidising gas, which may consist of nitrogen or another gas which is inert to chlorination. For this purpose gaseous hydrochloric acid may also be used.

The chlorination reactor consists of a cylinder of 150 litres capacity rotating around its own axis at a velocity of 25 r.p.m. Inside it there are two 30 watt fluorescent lamps and six refrigerating tubes.

The dry mixture and the chlorine and hydrogen gases are fed to the top of the reactor. The chlorinated resin flows from the bottom with the residual gases. Reaction temperature is controlled by the internal coolers and by means of cooling the reactor walls.

Operating conditions are as follows:

Resin throughput—12 kg./hour
Chlorine throughput—1.8 m.³/hour
Hydrogen throughput—0.018 m.³/hour
Average stay time—2 hours
Reaction temperature—50° C.

The chlorinated PVC is finally dried in a fluid bed reactor in a current of hot nitrogen.

Its characteristics are summarised in Table 1 (column 1) in which the characteristics of a chlorinated PVC obtained by the same process but without the intervention of hydrogen are shown for comparison (column 2) together with the characteristics of the corresponding starting PVC (column 3).

TABLE 1

| Characteristics | 1 | 2 | 3 |
|---|---|---|---|
| Percent chlorine in resin | 64.2 | 63.2 | 56.7 |
| Vicat softening point, °C | 110 | 102 | 82 |
| Thermal stability in minutes | 81 | 70 | 35 |

EXAMPLE 2

The text described in Example No. 1 is repeated exactly, but using the dry mixture consisting of:

|  | Parts |
|---|---|
| PVC | 100 |
| Carbon tetrachloride | 20 |

A chlorinated PVC is obtained whose characteristics are given in Table 2.

EXAMPLE 3

The text described in Example 1 is repeated exactly but the chlorine current is irradiated by means of a U.V. 100 w. lamp at the inlet of the reactor, the internal lamps being maintained extinguished. At the same time a current of hydrogen is introduced into the reactor of a quantity equal to 2.5% of the volume of the chlorine.

A chlorinated PVC is obtained whose characteristics are given in Table 2.

EXAMPLE 4

A dry mixture consisting of:

|  | Parts |
|---|---|
| PVC | 100 |
| Chloroform | 10 | is continuously prepared in a reactor rotating around its own axis of the type described in Example 1 under "chlorinator." The chlorination reactor comprises a vertical cylinder of 25 litres capacity, suitable for fluidising the dry mixture. Inside it there is a fluorescent 30 w. lamp. The dry mixture, saturated with chlorine is fed from above, the chlorine and hydrogen gases are fed from below, the chlorinated PVC is withdrawn from the centre and the residual gases are removed from the top of the reactor. These latter may be partially recycled.

The reaction temperature is controlled by internal refrigerants by means of cooling the reactor walls.

Operating conditions are as follows:

Resin throughput—6 kg./hour
Chlorine throughput—1.8 m.³/hour
Hydrogen throughput—0.018 m.³/hour
Average stay time—2 hours
Reaction temperature—50° C.

The chlorinated PVC is dried in a rotating reactor in a current of hot nitrogen. The characteristics of the final product are given in Table 2.

EXAMPLE 5

The text described in Example 4 is repeated exactly but the chlorine current is irradiated by a U.V. 400 w. lamp at the reactor inlet, the internal lamps being maintained extinguished.

At the same time a current of hydrogen is introduced into the chlorination reactor of a quantity equal to 2% of the volume of the chlorine.

The characteristics of the chlorinated PVC are given in Table 2.

TABLE 2

| Characteristics | Example | | | |
|---|---|---|---|---|
|  | 2 | 3 | 4 | 5 |
| Percent chlorine in resin | 63.2 | 63.5 | 63.5 | 63.6 |
| Vicat softening point, °C | 101 | 105 | 104 | 105 |
| Thermal stability in minutes | 78 | 92 | 82 | 90 |

What we claim is:

1. A proces for the dry chlorination of polyvinylchloride by means of gaseous chlorine, in the presence of a chlorination carrier and with the assistance of a photochemically active source in which the chlorination is carried out in the presence of gaseous hydrogen, said gaseous hydrogen being used in concentrations of less than about 10% by volume of the chlorine.

2. A process as claimed in claim 1, in which the photochemical activation source for the chlorination reaction consists of a U.V. lamp, an incandescent lamp or a fluorescent lamp.

3. A process as claimed in claim 1, in which the photochemical activation for the chlorination reaction comes about by means of the irradiation of the entire reacting mass.

4. A process as claimed in claim 1, in which the photochemical activation for the chlorination reaction comes about by means of irradiation limited to the gaseous chlorine and hydrogen mixture or only to the gaseous chlorine, in which case irradiation takes place at the inlet of the reactor.

5. A process as claimed in claim 1, in which chlorination is carried out at temperatures lying between 0° C. and 80° C.

6. A process as claimed in claim 1, working according to a flow arrangement of the continuous process type.

References Cited

UNITED STATES PATENTS 2,590,651  3/1962  Rosenberg _____ 204—159.18

FOREIGN PATENTS 1,325,466  6/1962  France.
1,110,873  5/1959  Germany.

MURRAY TILLMAN, Primary Examiner
R. B. TURER, Assistant Examiner

U.S. Cl. X.R.

204—159.2; 260—94.9